United States Patent [19]

Yetter et al.

[11] Patent Number: 4,749,557

[45] Date of Patent: * Jun. 7, 1988

[54] GRAPHITE FIBER GROWTH EMPLOYING NUCLEI DERIVED FROM IRON PENTACARBONYL

[75] Inventors: Wilson E. Yetter, Rochester, N.Y.; George W. Smith, Birmingham; Michael J. D'Aniello, Jr., Rochester, both of Mich.

[73] Assignee: General Motors Corporation, Detroit, Mich.

[*] Notice: The portion of the term of this patent subsequent to Jan. 21, 2003 has been disclaimed.

[21] Appl. No.: 871,099

[22] Filed: Jun. 5, 1986

Related U.S. Application Data

[63] Continuation-in-part of Ser. No. 804,244, Dec. 4, 1985, abandoned, which is a continuation of Ser. No. 678,093, Dec. 4, 1984, abandoned.

[51] Int. Cl.⁴ .......................... C01B 31/04; D01F 9/12
[52] U.S. Cl. .................. 423/447.3; 423/448; 423/453; 423/458
[58] Field of Search .............. 423/447.3, 448, 449, 423/453, 458

[56] References Cited

U.S. PATENT DOCUMENTS

| | | | |
|---|---|---|---|
| 2,796,331 | 6/1957 | Kauffman et al. | 423/447.3 |
| 3,498,749 | 3/1970 | Aldridge | 423/453 |
| 4,391,787 | 7/1983 | Tibbetts | 423/447.3 |
| 4,491,569 | 1/1985 | Tibbetts | 423/447.3 |
| 4,497,788 | 2/1985 | Bradley et al. | 423/447.3 |
| 4,565,684 | 1/1986 | Tibbetts et al. | 423/458 |
| 4,572,813 | 2/1986 | Arakawa | 423/447.3 |

Primary Examiner—John Doll
Assistant Examiner—Robert M. Kunemund
Attorney, Agent, or Firm—Douglas D. Fekete

[57] ABSTRACT

Submicron iron nuclei for growing graphite fibers by pyrolysis of a gaseous hydrocarbon compound, preferably methane, are formed by controlled decomposition of iron pentacarbonyl vapors.

4 Claims, 1 Drawing Sheet

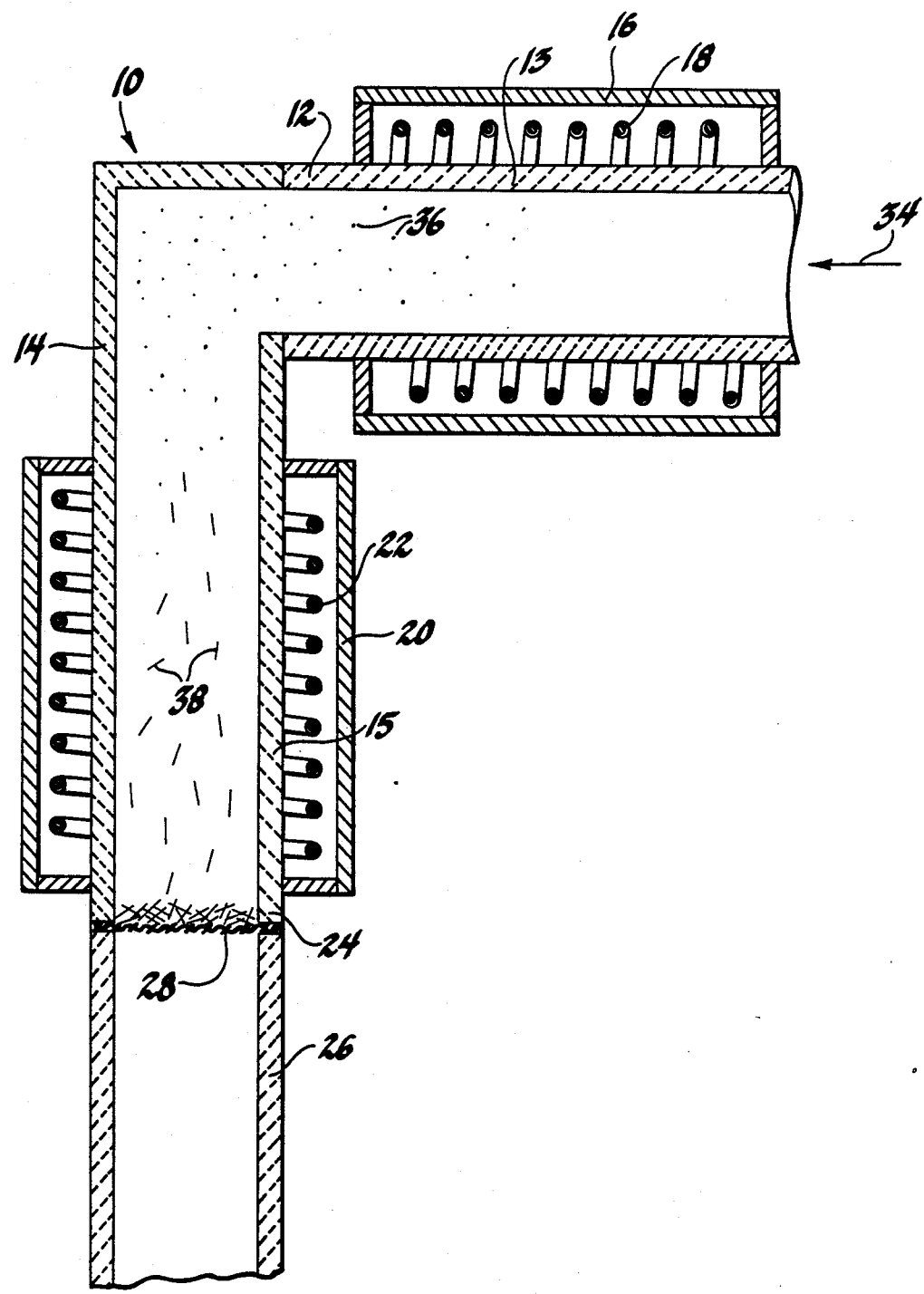

GRAPHITE FIBER GROWTH EMPLOYING NUCLEI DERIVED FROM IRON PENTACARBONYL

BACKGROUND OF THE INVENTION

This is a continuation-in-part of U.S. Ser. No. 804,244 filed on Dec. 4, 1985, now abandoned which is a continuation of U.S. Ser. No. 678,093 filed on Dec. 4, 1984, now abandoned.

This invention relates to a process for producing graphite fibers by pyrolysis of a gaseous hydrocarbon, preferably natural gas. More particularly, this invention relates to growing carbon filaments using minute iron nuclei derived from controlled decomposition of iron pentacarbonyl vapors.

Growth of graphite fibers by thermal decomposition of a gaseous hydrocarbon occurs in two stages. During a first stage, nascent carbon reacts with a suitable metal nuclei to produce microscopic carbon filaments. During a second stage, deposition of additional pyrolytic carbon thickens the filaments into fibers. Product fibers are preferably 5 to 15 microns in diameter and up to several centimeters long. The fibers are suitable for use as filler in plastic or other composites.

Minute iron particles are preferred nuclei for forming filaments during the first stage. Iron particles may be formed, for example, by evaporating a ferric nitrate solution on a suitable surface and decomposing the resulting iron oxide residue. To be effective for nucleating filament formation, a particle size less than about 0.1 micron is preferred.

It is an object of this invention to provide an improved process for producing particulate iron nuclei suitable for catalyzing pyrolytic carbon to produce microscopic filaments, which nuclei are formed by controlled decomposition of a vaporous iron compound, in particular iron pentacarbonyl. A main feature of this invention is that iron is introduced into a reaction vessel as a vaporous compound and forms metallic particles therein suitable for catalyzing filament formation.

It is a further object of this invention to provide an improved process for forming graphite fibers by pyrolysis of a gaseous hydrocarbon compound in the presence of particulate iron nuclei, which process comprises initial decomposition of a vaporous iron compound, in particular iron pentacarbonyl, under conditions effective to produce nuclei of suitable size for catalyzing nascent carbon to form microscopic precursor filaments.

SUMMARY OF THE INVENTION

In accordance with a preferred embodiment of this invention, iron pentacarbonyl vapors are introduced into a suitable reaction vessel and heated at a temperature between 300° C. and 400° C. Upon heating, the iron compound dissociates to form elemental iron. The resulting iron coalesces to produce minute metallic particles having a size effective for catalyzing pyrolytic carbon filament formation. In one embodiment of this invention, the product iron particles rain onto a growing surface within the vessel, whereafter a gaseous hydrocarbon is introduced into the vessel and thermally decomposed. In an alternate embodiment, the particles are entrained within a gas stream containing the reactant hydrocarbon compound, while heating to a temperature sufficient to decompose the hydrocarbon. In either embodiment, nascent carbon derived from the hydrocarbon reacts with the minute particles to form microscopic carbon filaments. The microscopic filaments are suitable precursors for thickening to produce graphite fibers.

Thus, the method of this invention forms submicron iron nuclei by decomposing vaporous iron pentacarbonyl, Fe(CO)$_5$, and utilizes the nuclei to form carbon filaments. The iron carbonyl compound dissociates in accordance with the following reaction:

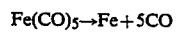

Fe(CO)$_5$→Fe+5CO

The dissociation rate and particle-forming kinetics are dependent on temperature. At a reaction temperature above about 500° C., decomposition of the iron carbonyl is extremely fast and cannot be controlled. As a result, the iron tends to deposit as an agglomerated mass within the reaction vessel, instead of forming the desired discrete microparticles. At a temperature below about 300° C., the reaction time is prolonged such that a substantial portion of the iron carbonyl is exhausted unreacted. A temperature between about 300° C. and 400° C. is preferred for forming submicron iron particles that are effective nuclei. As used herein, effective submicron particle refers to a particle having a maximum diamter less than 0.1 micron and suitable for catalyzing pyrolytic carbon filament formation.

DESCRIPTION OF THE DRAWINGS

The present invention will be further described with reference to the accompanying drawing showing a reactor for carrying out an embodiment of this invention wherein carbon fibers are grown using iron nuclei formed in accordance with this invention and entrained in a gas stream.

DETAILED DESCRIPTION OF THE INVENTION

In a preferred embodiment, graphite fibers are grown on a surface bearing iron nuclei formed in accordance with this invention. The fibers are grown within a cylindrical tubular quartz reactor having a gas inlet at one end and an outlet at the opposite end. The inner diameter of the reactor is 1.7 centimeters. The fibers grow upon the interior reactor wall within a heated midsection about 20 centimeters long.

Prior to fiber growth, the reactor wall is nucleated by in-situ decomposition of an iron carbonyl compound. The reactor is heated at about 330° C. About 1.5 micrograms (1 microliter) of liquid iron pentacarbonyl, Fe(CO)$_5$, are injected into a stream of ambient temperature argon gas, whereupon the iron carbonyl vaporizes. The argon stream carries the vapors into the reactor. The gas flow rate within the reactor is about 30 cubic centimeters per minute, resulting in a residence time of the argon gas within the heated midsection of about 51 seconds. Under these conditions, the iron carbonyl compound decomposes within the heated zone and produces an abundance of spherical iron particles that deposit onto the inner reactor wall. The particles have diameters within the range of 30 to 100 nanometers and are suitably dispersed on the reactor wall for growing a large number of fibers.

Graphite fibers are grown by a preferred two-step process comprising thermal decomposition of methane from a natural gas source. The temperature of the reactor is increased to about 1050° C. A mixture of hydrogen gas and about 11 volume percent natural gas (about 97 volume percent methane) is admitted to the reactor at a rate of about 40 cubic centimeters per minute for about one-half hour. During this time, carbon derived from methane pyrolysis reacts with the iron particles on the reactor wall to produce microscopic carbon filaments that protrude from the wall. Thereafter, undiluted natural gas is flowed into the reactor at a rate of 40 cubic centimeters per minute for about 20 minutes while the temperature is maintained at about 1050° C. Additional carbon deposits onto the filaments to thicken the filaments into the product fibers. The product fibers are substantially identical to fibers produced by natural gas pyrolysis using other types of nuclei, for example, nuclei derived from decomposition of an iron nitrate solution as described in U.S. Pat. No. 4,565,684.

In the described embodiment, iron pentacarbonyl decomposition takes place within a time sufficient to form the iron particles within the reaction zone, i.e., less than the residence time. By residence time, it is meant the mean time required for nonreactive gas molecules to travel through the reaction zone, which is related to reactor geometry and gas flow rate. Also, it is desired that the iron particles be distributed on the available surface to maximize the area effective for fiber growth. It is believed that an optimum nuclei distribution requires a reaction time greater than one-tenth the residence time. Although in the described embodiment the iron carbonyl compound was initially blended with argon gas, other inert gas may be substituted as the carrier.

In the described embodiment for growing graphite fibers on a nuclei-bearing surface, the fibers are grown by a two-step methane pyrolysis process described in U.S. Pat. No. 4,565,684, incorporated herein by reference, but utilizing nuclei derived from iron pentacarbonyl decomposition in accordance with this invention. Initially, the iron nuclei are reacted with the methane-derived carbon to form microscopic filaments. During this step, a predominantly hydrogen gas comprising about 5 to 15 volume percent methane is flowed over the nucleated surface and heated at a temperature preferably between about 1000° C. and 1100° C. After the filaments are formed, the methane concentration in the gas phase is increased to above 25 volume percent to thicken the filaments into fibers. During this thickening step, undiluted natural gas is preferred.

In an alternate embodiment of this invention, graphite fibers are grown from iron nuclei entrained in a gas stream. Referring to the Figure, there is shown schematically a reaction vessel 10 comprising a horizontal cylindrical ceramic tube 12 perpendicularly intersecting a vertical cylindrical ceramic tube 14 so as to define a continuous gas passage. Gas flows horizontally through tube 12 and thereafter vertically downwardly through tube 14. The inner diameters of tubes 12 and 14 are 19 millimeters. A furnace 16 comprising a helical electrical resistance heating element 18 heats a first reaction zone 13 within tube 12. Similarly, a second furnace 20 comprising a helical electrical resistance heating element 22 independently heats second reaction zone 15 about 30 centimeters long within tube 14. Gas outlet end 24 of tube 14 is hermetically connected to an exhaust tube 26 through which spent gases are vented. A gas permeable fabric 28 extends across tube end 24 in the gas stream. Fabric 28 permits gas flow therethrough but filters product fibers from the gas stream.

To grow fibers, electrical current is applied to element 18 to heat zone 13 at about 330° C. and to element 22 to heat zone 15 at about 1050° C. A gas composed predominantly of equal parts natural gas and hydrogen is introduced into tube 12, as indicated by arrow 34, at a rate of about 10 centimeters per minute. The gas also comprises iron pentacarbonyl vapors bled therein upstream of zone 13. As the gas flows through heated zone 13, the iron compound decomposes to produce iron particles 36, exaggerated in the Figure for purposes of illustration. The temperature within reaction zone 13 is insufficient to produce significant decomposition of the natural gas. Particles 36 are entrained in the gas stream and are carried into tube 14. Within heated zone 15, methane from the natural gas is decomposed. The resulting carbon reacts with iron particles 36 to produce microscopic carbon filaments. Deposition of additional nascent carbon thickens the carbon filaments and produces graphite fibers 38, exaggerated in the Figure for purposes of illustration. As the gas stream passes through fabric 28, fibers 38 are collected thereon.

In the described embodiments, graphite fibers are grown from methane introduced in natural gas. Iron nuclei produced in accordance with this invention are also suitable for growing fibers from pyrolytic carbon derived from other gaseous hydrocarbons, for example, benzene.

While this invention has been described in terms of certain embodiments thereof, it is not intended that it be limited to the above description but rather only to the extent set forth in the claims that follow.

The embodiments of the invention in which an exclusive propery or privilege is claimed are defined as follows:

1. In a method for manufacturing carbon filaments by pyrolysis of a faseous hydrocarbon compound in the presence of iron nuclei, the improvement comprising
   forming the iron nuclei prior to initiation of said gaseous hydrocarbon pyrolysis by heating a gas containing iron pentacarbonyl vapors at a temperature between 300° C. and 500° C. to decompose the iron pentacarbonyl to produce iron particles having diameters less than 0.1 micron and suitable for use as the nuclei for forming the carbon filaments.

2. In a method for manufacturing graphite fibers by pyrolysis of a gaseous hydrocarbon compound in the presence of iron nuclei distributed upon a suitable growing surface, whereupon said nuclei react with pyrolytic carbon derived from the hydrocarbon compound to grow microscopic carbon filaments suitable for thickening into product fibers, the improvement comprising
   forming the iron nuclei by exposing the surface to a gas containing iron pentacarbonyl vapors and heating at a temperature between 300° C. and 500° C. to decompose the iron pentacarbonyl to produce iron particles that deposit onto the surface and suitable for use as a nuclei for forming the carbon filaments.

3. In a method for manufacturing graphite fibers by methane pyrolysis in the presence of particulate iron nuclei distributed upon a suitable growing surface, which method comprises contacting the nuclei-bearing surface with a hydrogen gas stream comprising about 5 to 15 volume percent methane from a natural gas source at a temperature sufficient to decompose the methane and react carbon derived thereby with the iron nuclei to grow microscopic carbon filaments, and thereafter contacting the filaments with a gas comprising at least 25 volume percent methane from a natural gas source at a temperature sufficient to deposit additional pyrolytic carbon to thicken the filaments to form the product fibers, the improvement comprising depositing, prior to methane pyrolysis, iron nuclei onto the surface by passing into contact therewith a predominantly inert gas stream containing iron pentacarbonyl vapors while heating at a temperature between 300° C. and 400° C. to decompose the iron pentacarbonyl to produce iron particles having diameters less than 0.1 micron that deposit onto the surface and form the nuclei.

4. In a method for manufacturing graphite fibers by methane pyrolysis in the presence of particulate iron nuclei entrained within a gas stream, said gas stream comprising methane from a natural gas source, the improvement comprising dispersing iron pentacarbonyl vapors into the gas stream prior to methane pyrolysis while heating at a temperature between about 300° C. and 400° C. decompose the iron pentacarbonyl to produce iron particles having diameters less than 0.1 micron that become entrained in the gas stream to form the nuclei.

* * * * *